No. 769,160. PATENTED SEPT. 6, 1904.
P. HIEN.
FRICTION SPRING MECHANISM.
APPLICATION FILED JAN. 14, 1904.
NO MODEL.

WITNESSES
J. S. Custer
Jas. B. MacDonald

INVENTOR
Phillip Hien
By E. Wright
Att'y.

No. 769,160. Patented September 6, 1904.

UNITED STATES PATENT OFFICE.

PHILLIP HIEN, OF CHICAGO, ILLINOIS.

FRICTION SPRING MECHANISM.

SPECIFICATION forming part of Letters Patent No. 769,160, dated September 6, 1904.

Application filed January 14, 1904. Serial No. 189,003. (No model.)

*To all whom it may concern:*

Be it known that I, PHILLIP HIEN, a citizen of the United States, residing in Chicago, county of Cook, State of Illinois, have invented a certain new and useful Improvement in Friction Spring Mechanism, of which improvement the following is a specification.

This invention relates in general to friction spring devices, and more particularly to that type of springs composed of a plurality of overlapping or intercalated resilient plates or leaves which are subjected to a relative sliding movement upon each other as the plates are deflected under a transverse strain; and one of the objects of the invention is to provide means for greatly increasing the relative sliding movement of the plates upon each other under a given amount of transverse deflection, and thereby greatly increase the frictional resistance of the spring mechanism. In the ordinary elliptical springs of this character, as heretofore used, the several plates or leaves composing the spring have usually all been secured together at substantially the same point, so that as the free portion of adjacent plates slide in the same direction only a small amount of frictional resistance is generated. By means of my improvement the free portions of adjacent plates are caused to slide upon each other in relatively opposite directions when the plates are deflected transversely under strain, whereby the frictional resistance offered is vastly increased.

While my invention is broadly applicable to springs of this type generally, it is more especially adapted to be employed in connection with draft appliances for railway-cars for exerting a yielding resistance in transmitting strains and gradually absorbing shocks between the draw-bar and the car-frame incident to the running and switching of railway-cars.

I will now describe more in detail one form of device embodying my invention and designed for this purpose.

Figure 1:
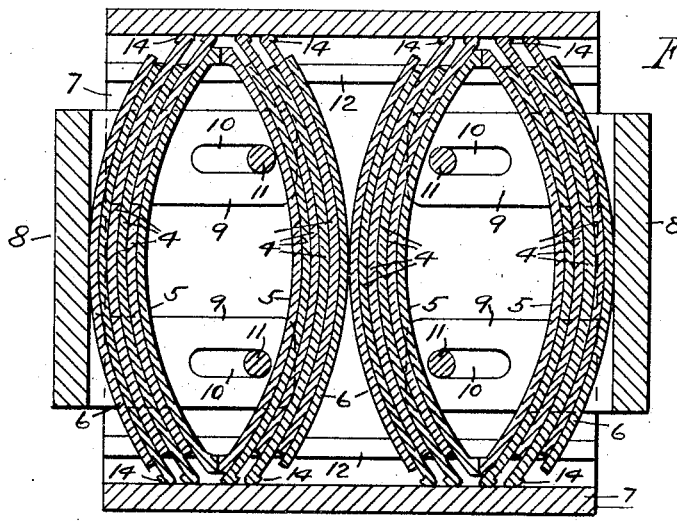
Figure 2:
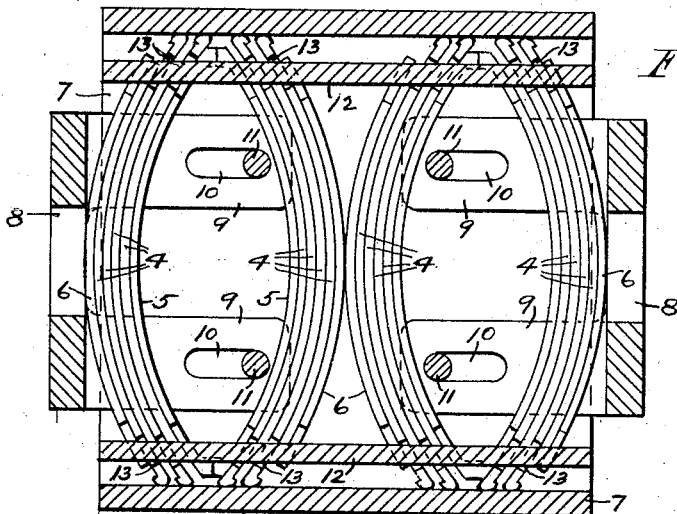
Figure 3:
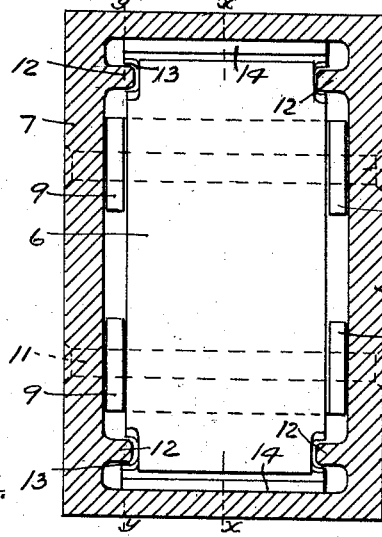

In the accompanying drawings, Figure 1 is a central longitudinal section of a preferred construction embodying my improvement, the section being taken on the line *x x* of Fig. 3; Fig. 2, a longitudinal section taken on the line *y y* of Fig. 3; and Fig. 3, a central transverse section of the device shown in Figs. 1 and 2.

According to the construction shown, the springs are composed of two or more sets or nests formed of a plurality of intercalated or overlapping curved resilient plates 4, the sets being reversely curved, so as to resemble elliptical springs, and the plates 4 being preferably located in a casing 7, with the opposite ends of adjacent plates abutting against the opposite side walls of the casing. These ends may be enlarged or thickened, if desired, as indicated at 14, for securing a larger and firmer bearing between the ends of the plates and the casing. In order to hold the opposite ends of adjacent plates fixed to the casing and allow for the expansion or sliding movement of the free ends of adjacent plates in opposite directions, the ends of alternate plates 4 on the same side of the casing are provided with notches 13, which engage or fit over the ribs 12, running longitudinally of the casing. The free ends of the plates may also be cut away or notched on the corners, if necessary, to prevent striking the ribs on the opposite side of the casing when the plates are subject to transverse deflection under strain.

When the springs are made in the elliptical form shown in the drawings, I preferably provide a pair of reversely-curved free plates 5 on the inside of the ellipse and having their ends bearing upon each other, and another free plate 6 is provided on the outer or convex side of the bunch or nest of fixed-ended plates 4 for the purpose of transmitting the thrust or strain directly to the other plates to deflect the same.

The casing 7 is preferably made in the form of a rectangular box with open ends, through which the plates may be inserted and slipped along on the ribs into position.

In order to retain the plates snugly in position at all times when the mechanism is not subjected to strain, the plates 8 may be employed having right-angled extensions 9, provided with slots 10 for engaging the rivets or bolts 11, carried by the casing. When the springs are expanded to the normal position, the plates 8 are held against further outward movement by means of the rivets 11 engaging the ends of the slots 10; but when the mechanism is subjected to a strain applied to either or both of the plates 8 these plates are moved inward, causing a transverse deflection of the resilient plates 4. This action produces a flattening of the ellipse and a straightening of the curved plates, and since opposite ends of adjacent plates abut against opposite sides of the casing a sliding movement of the free ends of the plates upon each other will be produced, each plate sliding in the opposite direction to that of its two adjacent plates, thereby creating a considerable amount of frictional resistance in addition to the spring resistance for opposing the strain. When the strain or pressure upon the follower-plates 8 is relieved, the springs expand by virtue of the resiliency of the curved plates and reassume their normal position, the opposite ends of adjacent plates being held in their relatively fixed positions by means of the notches 13 therein engaging the ribs 12 of the casing and preventing their ends from sliding inward. This causes the relative sliding movement of the adjacent plates on themselves in opposite directions in the release action of the mechanism in the reverse order from that before described when the mechanism is subjected to strain.

While I have illustrated a rectangular casing for holding my improved spring mechanism, it is obvious that it may be otherwise mounted, and various means may be devised for securing the opposite ends of adjacent plates or for causing said adjacent plates to slide upon each other in opposite directions when subjected to transverse deflection.

It will also be seen that my improvement is adapted to give any desired amount of frictional resistance and that the device is compactly arranged and may be readily applied between the usual follower-plates of an ordinary draw-gear or buffing apparatus for railway-cars.

Having now described my invention, what I claim as new, and desire to secure by Letters Patent, is—

1. A friction-spring comprising a plurality of resilient plates overlapping each other, and means for securing adjacent plates at their opposite ends.

2. A friction-spring comprising a plurality of intercalated resilient plates, and means for causing a relative sliding movement of adjacent plates in opposite directions when the plates are transversely deflected.

3. A friction spring mechanism comprising a plurality of transversely-resilient plates nested together, and means for causing a sliding movement of one set of alternate plates in one direction and the other set of alternate plates in the opposite direction when transversely deflected.

4. A friction spring mechanism comprising a plurality of transversely-resilient plates nested together, and means for holding the opposite ends of adjacent plates relatively fixed when the plates are transversely deflected.

5. A friction spring mechanism comprising a plurality of transversely-resilient curved plates overlapping each other, and means for causing a relative sliding movement of adjacent plates in opposite directions when subjected to transverse deflection.

6. A friction spring mechanism comprising a plurality of intercalated resilient curved plates, and means for holding opposite ends of adjacent plates relatively fixed when subjected to transverse deflection.

7. A friction spring mechanism comprising two or more sets of reversely-curved resilient plates, the plates of each set overlapping each other, and means for causing a relative sliding movement of adjacent plates in opposite directions when subjected to transverse deflection.

8. A friction spring mechanism comprising two or more sets of reversely-curved spring-plates, those of each set overlapping each other, and means for holding the opposite ends of adjacent plates relatively fixed when the sets are subjected to transverse deflection.

9. A friction spring mechanism comprising a casing, a plurality of resilient plates placed transversely therein and overlapping each other, and means for securing opposite ends of adjacent plates to the casing.

10. A friction spring mechanism comprising a casing containing a plurality of transversely-resilient curved plates overlapping each other, and means for securing opposite ends of adjacent plates at opposite sides of the casing.

11. A friction spring mechanism comprising a casing containing two or more sets of reversely-curved transversely-resilient plates, the plates of each set overlapping each other, and means for securing opposite ends of adjacent plates at opposite sides of the casing.

12. A friction spring mechanism comprising a casing having a longitudinal rib or flange on opposite sides, and a plurality of transversely-resilient overlapping plates located therein, adjacent plates having notches at opposite ends for engaging said rib.

13. A friction spring mechanism comprising two or more sets of reversely-curved resilient plates overlapping each other and of an elliptical form, adjacent plates being relatively fixed at opposite ends, and a pair of reversely-curved free plates located upon the inner or concave sides of the ellipse and having their ends engage each other.

14. A friction spring mechanism comprising a casing, a plurality of transversely-resilient overlapping plates located therein, means for securing opposite ends of adjacent plates at opposite sides of the casing, and means slidably mounted upon the casing for normally retaining said plates in position.

In testimony whereof I have hereunto set my hand.

PHILLIP HIEN.

Witnesses:
   Geo. L. Wilkinson,
   C. C. Cunningham.